United States Patent
Jandhyala et al.

(10) Patent No.: US 10,776,575 B2
(45) Date of Patent: *Sep. 15, 2020

(54) RECOGNITION OF FIELDS TO MODIFY IMAGE TEMPLATES

(71) Applicant: International Business Machines Corporation, Armonk, NY (US)

(72) Inventors: Srinivas Jandhyala, Hyderabad (IN); Krishnan P. Rajagopalan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/149,298

(22) Filed: Oct. 2, 2018

(65) Prior Publication Data

US 2019/0042555 A1  Feb. 7, 2019

Related U.S. Application Data

(63) Continuation of application No. 14/928,112, filed on Oct. 30, 2015, now Pat. No. 10,120,856.

(51) Int. Cl.
*G06F 17/20* (2006.01)
*G06F 40/186* (2020.01)
*G06K 9/00* (2006.01)
*G06F 40/174* (2020.01)
*G06F 40/295* (2020.01)
*G06F 3/0484* (2013.01)

(52) U.S. Cl.
CPC .......... *G06F 40/186* (2020.01); *G06F 3/0484* (2013.01); *G06F 40/174* (2020.01); *G06F 40/295* (2020.01); *G06K 9/00449* (2013.01); *G06K 2209/01* (2013.01)

(58) Field of Classification Search
CPC ........................... G06F 40/186; G06F 3/04883
See application file for complete search history.

(56) References Cited

U.S. PATENT DOCUMENTS

| | | | |
|---|---|---|---|
| 6,886,136 B1 | 4/2005 | Zlotnick et al. | |
| 7,809,615 B2 | 10/2010 | Hui et al. | |
| 8,160,865 B1* | 4/2012 | Coughlan | G06F 40/186 704/4 |
| 2005/0268217 A1* | 12/2005 | Garrison | G06F 40/174 715/234 |
| 2007/0154098 A1* | 7/2007 | Geva | G06K 9/2063 382/209 |
| 2007/0168382 A1* | 7/2007 | Tillberg | G06K 9/00449 |
| 2008/0172597 A1* | 7/2008 | DeHaan | G06F 40/18 715/222 |
| 2009/0254803 A1* | 10/2009 | Bayne | G06F 40/174 715/222 |
| 2013/0230246 A1 | 9/2013 | Nuggehalli | |
| 2017/0124059 A1 | 5/2017 | Jandhyala et al. | |

OTHER PUBLICATIONS

Appendix P List of IBM Patents or Applications Treated as Related. Dated Oct. 1, 2018. Two pages.

* cited by examiner

*Primary Examiner* — Keith D Bloomquist
(74) *Attorney, Agent, or Firm* — Aaron N. Pontikos

(57) ABSTRACT

Modifying image templates based on recognition of fields (zones). A template is created based on a first form and, upon application of the template to a second form, fields of the template are modified to align with fields of the second form.

20 Claims, 5 Drawing Sheets

RECOGNITION OF FIELDS TO MODIFY IMAGE TEMPLATES

BACKGROUND

The present invention relates generally to the field of image analysis, and more particularly to template matching.

Image recognition products capture content from an image. Some image recognition products employ a template. Some of templates are trained to improve performance (trained templates). Using trained templates to capture content is sometimes also called zonal optical character recognition (OCR). Zonal OCR relies on a set of zones (fields), each of which can be visualized as a bounding rectangle on an image. A field can be represented as a set of pixel coordinates, which are used to retrieve the content from an image. Because various documents include similar fields having various placements, various trained templates are required to properly analyze each document. Each trained template must be manually created. A trained template can have ten or more fields and there can be hundreds of trained templates, depending on how a system is used. Manual entry of hundreds or thousands of fields is time consuming, repetitive, and error prone.

SUMMARY

According to an aspect of the present invention, there is a method, computer program product, and/or system that performs the following operations (not necessarily in the following order): (i) applying a first template, the first template having a first template field name corresponding to a first template field, to a form, the form having a form field name corresponding to a form field to generate a template-form document; (ii) determining the first template field is not proximate the form field name on the template-form document; (iii) generating a second template from the first template by relocating the first template field by, with reference to the first template, locating the first template field proximate the form field name, the form including a form content associated with the form field name, the form content located in a form field proximate the form field name, the form content having a form field length, the relocated first template field being a second template field; and (iv) generating a set of coordinates for the second template field including the form field length.

DETAILED DESCRIPTION

Figure 1:
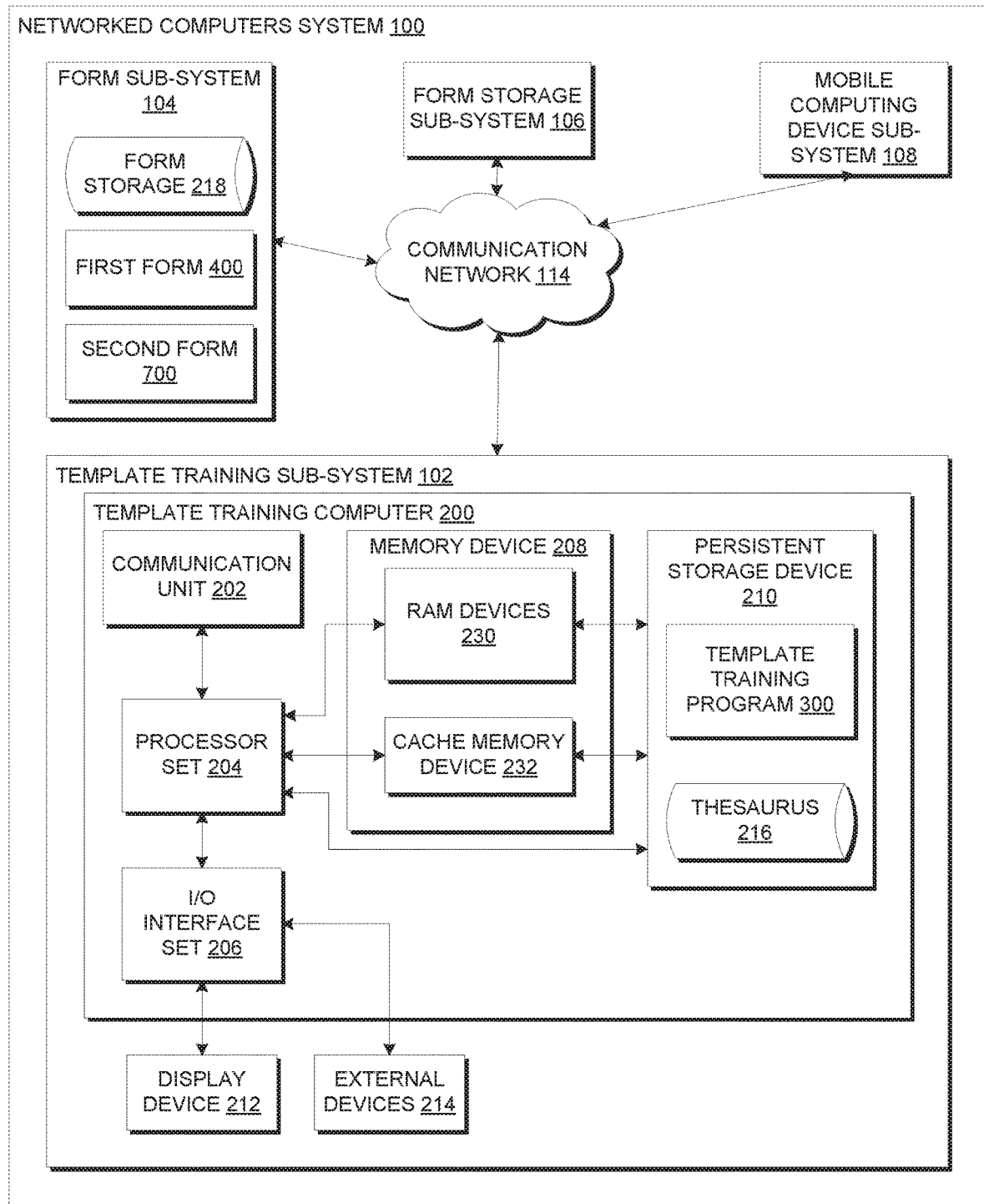
FIG. 1 is a block diagram view of a first embodiment of a system according to the present invention.

Modifying image templates based on recognition of fields (zones). A template is created based on a first form and, upon application of the template to a second form, fields of the template are modified to align with fields of the second form. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: template training sub-system 102; form sub-system 104; form storage sub-system 106; mobile computing device sub-system 108; and communication network 114. Template training sub-system 102 contains: template training computer 200; display device 212; and external devices 214. Template training computer 200 contains: communication unit 202; processor set 204; input/output (I/O) interface set 206; memory device 208; and persistent storage device 210. Memory device 208 contains: random access memory (RAM) devices 230; and cache memory device 232. Persistent storage device 210 contains: thesaurus 216; and template training program 300. Form sub-system 104 contains: form storage 218; first form 400; and second form 700.

Template training sub-system 102 is, in many respects, representative of the various computer sub-systems in the present invention. Accordingly, several portions of template training sub-system 102 will now be discussed in the following paragraphs.

Template training sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Template training program 300 is a collection of machine readable instructions and/or data that is used to create, manage, and control certain software functions that will be discussed in detail, below, in the Example Embodiment sub-section of this Detailed Description section.

Template training sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between template training sub-system 102 and client sub-systems.

Template training sub-system 102 is shown as a block diagram with many double arrows. These double arrows (no separate reference numerals) represent a communications fabric, which provides communications between various components of template training sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for template training sub-system 102; and/or (ii) devices external to template training sub-system 102 may be able to provide memory for template training sub-system 102.

Thesaurus 216 is a storage that includes various field names and/or potential alternative field names. As depicted in FIG. 1, thesaurus 216 exists within persistent storage device 210. Thesaurus 216 can also be located within any other sub-system connected to communication network 114.

Form storage 218 is a storage that includes various forms. A set of forms within form storage 218 are trained templates. Form storage 218 contains first form 400. As depicted in FIG. 1, form storage 218 exists within form sub-system 104. Form storage 218 can also be located within any other sub-system connected to communication network 114.

Template training program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Template training program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to template training sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with template training computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., template training program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
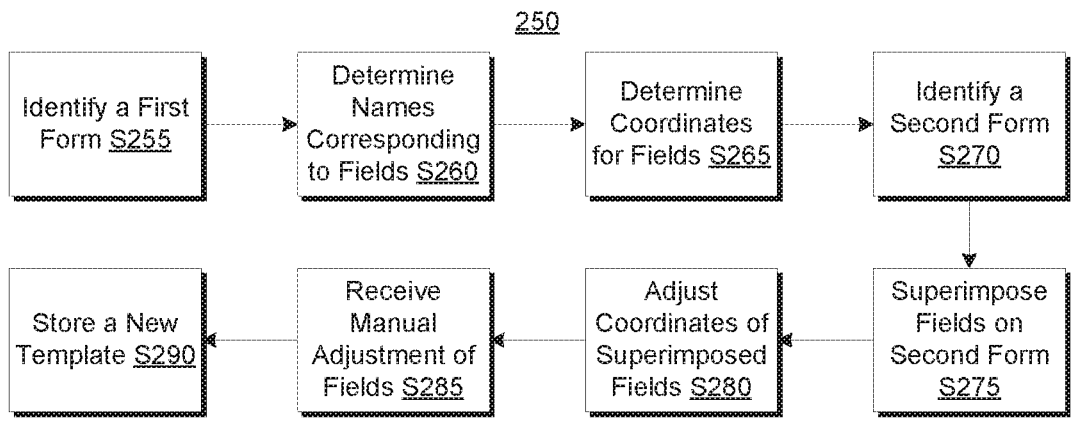
FIG. 2 is a flowchart showing a first embodiment method performed, at least in part, by the first embodiment system.
Figure 3:
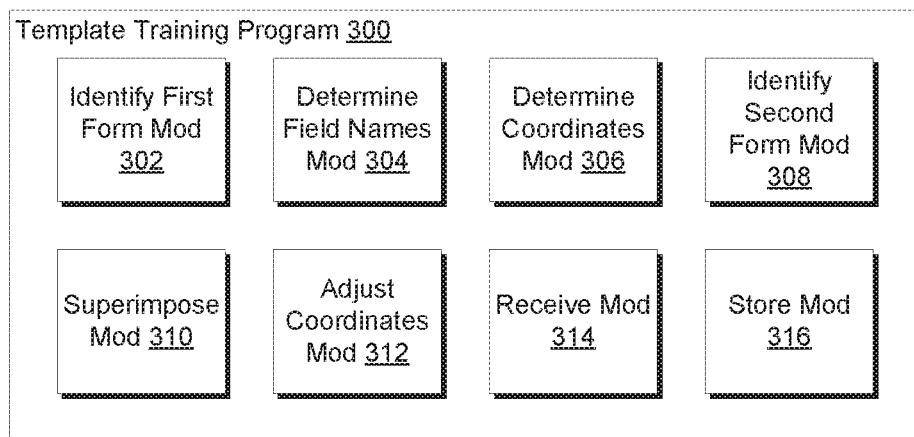
FIG. 3 is a block diagram view of a machine logic (e.g., software) portion of the first embodiment system.

FIG. 2 shows flowchart 250 depicting a method according to the present invention. FIG. 3 shows template training program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example John is scanning a set of invoices for his records.

Processing starts at operation S255, where identify first form module (mod) 302 identifies a first form. A first form is sometimes also called a master template. In some embodiments of the present invention, identify first form mod 302 identifies a first form as an input. In this example, identify first form mod 302 identifies first form 400 (FIG. 4), an invoice from Stuart Apothecary, based on input from John. In some embodiments of the present invention, forms are stored in a repository, such as form storage 218. In some embodiments of the present invention, identify first form mod 302 retrieves a trained template from form storage 218. In some embodiments of the present invention, a trained template is a form for which fields and coordinates were previously determined. In some embodiments of the present invention, identify first form mod 302 retrieves a trained template from form storage 218 and processing proceeds to operation S270 (omitting operation S260 and operation S265). Identifying a first form is sometimes also called implementing a trained template. In some embodiments of the present invention, identify first form mod 302 identifies a first form at a run time. In some embodiments of the present invention, identify first form mod 302 identifies a first form based on a similarity to a second form.

Processing proceeds to operation S260, where determine field names mod 304 determines a set of field names corresponding to a set of fields. Fields are sometimes also called zones. Determining a set of field names corresponding to a set of fields is sometimes also called data extraction. In this example, determine field names mod 304 determines field names for two fields: identified field 402; and identified field 404. In some embodiments of the present invention, determine field names mod 304 receives field names as an input. In some embodiments of the present invention, determine field names mod 304 determines a set of field names for all fields on a form. In some embodiments of the present invention, determine field names mod 304 determines field names for a set of preselected fields. In some embodiments of the present invention, determine field names mod 304 uses OCR to determine a set of field names. In some embodiments of the present invention, determine field names mod 304 uses zonal OCR to determine a set of field names.

Processing proceeds to operation S265, where determine coordinates mod 306 determines a set of coordinates for a set of fields. Determine coordinates mod 306 uses field names (identified by determine field names mod 304) to determine coordinates for content of a field. Determine coordinates mod 306 can express coordinates of content in a variety of manners. In this example, determine coordinates mod 306 uses OCR to determine content of each identified field (i.e., the invoice date, Aug. 17, 2015, and the invoice number, 2041955). In this example, determine coordinates mod 306 uses content locations to determine coordinates of the content. In this example, determine coordinates mod 306 expresses coordinates in inches in a format {x-start, x-distance, y-start, y-distance}, where "x-start" represents the start of the content of a field with respect to an x-axis of a form and "x-distance" represents the length of the content with respect to the x-axis of the form. In this example, determine coordinates mod 306 determines coordinates of the invoice date for first form 400 are {6.25, 1.25, 2.53125, 0.25} and coordinates of the invoice number for first form 400 are {6.0625, 1.125, 2.875, 0.25}. In this example, first coordinates form 500 (FIG. 5) shows a screenshot of determine coordinates mod 306 determining a set of coordinates.

In some embodiments of the present invention, determine coordinates mod 306 determines coordinates for content of a set of fields received as an input. In some embodiments of the present invention, determine coordinates mod 306 determines coordinates for content of all fields on a form. In some embodiments of the present invention, determine coordinates mod 306 determines coordinates for content of a set of preselected fields. In some embodiments of the present invention, determine coordinates mod 306 uses OCR to locate content of a field on a form. In some embodiments of the present invention, determine coordinates mod 306 uses zonal OCR to locate content of a field on a form.

Processing proceeds to operation S270, where identify second form mod 308 identifies a second form. In some embodiments of the present invention, identify second form mod 308 identifies a second form as an input. In this example, identify second form mod 308 identifies second form 700 (FIG. 7), an invoice from Rapid Car Repair, based on input from John. In some embodiments of the present invention, identify second form mod 308 identifies a second form in form storage 218.

Processing proceeds to operation S275, where superimpose mod 310 superimposes a set of fields on a second form. Superimposing a set of fields on a second form is sometimes also called applying a skin and/or mapping. Data extraction sometimes also includes superimposing a set of fields on a second form. Superimpose mod 310 superimposes a set of fields on a second form based, at least in part, on a set of coordinates. In this example, superimpose mod 310 superimposes a set of fields determined in operation S260 on a second form determined in operation S265 (second form 700), based, at least in part, on a set of coordinates determined in operation S270 (identified field 502 and identified field 504). In this example, masked form 800 (FIG. 8) shows a screenshot of superimpose mod 310 superimposing a set of fields on a second template. In some embodiments of the present invention, superimpose mod 310 uses a scaling factor to scale a set of coordinates based on dimensions of a first form and a second form. In some embodiments of the present invention, superimpose mod 310 initializes a set of fields. In some embodiments of the present invention, superimpose mod 310 initializes a set of fields corresponding to a set of fields of a first form. In some embodiments of the present invention, superimpose mod 310 superimposes a set of fields on a second form at a design time. In some embodiments of the present invention, superimpose mod 310 superimposes a set of fields on a second form at a design time, allowing a developer to train a new template. In some embodiments of the present invention, superimpose mod 310 superimposes a set of fields on a second form at a run time. In some embodiments of the present invention, superimpose mod 310 superimposes a set of fields on a second form at a run time, allowing a template training sub-system to create a new template at a run time.

Processing proceeds to operation S280, where adjust coordinates mod 312 adjusts coordinates of a set of fields superimposed on a second form. Adjusting coordinates is sometimes also called offsetting or generating a second set of coordinates. Adjust coordinates mod 312 determines that coordinates of a field superimposed on a second form do not align with a location of a corresponding field on the second form. In some embodiments of the present invention, adjust coordinates mod 312 determines that a set of field names on a second form are synonyms of a set of field names on a first form. In some embodiments of the present invention, adjust coordinates mod 312 uses a thesaurus to determine that field names on various forms are synonyms. Adjust coordinates mod 312 adjusts coordinates of a field superimposed on a second form. In this example, adjust coordinates mod 312 uses OCR to determine coordinates for locations of identified field 702 and identified field 704 and adjusts coordinates of fields superimposed on second form 700 (resulting in adjusted field 902 and adjusted field 904). Alternatively, adjust coordinates mod 312 uses zonal OCR to determine coordinates for locations of identified field 702 and identified field 704. Adjust coordinates mod 312 can express coordinates of content in a variety of manners. In some embodiments of the present invention, an offset is identified. In some embodiments of the present invention, an offset is zero. In some embodiments of the present invention, an offset represents a change in a pixel location for a set of coordinates. In some embodiments of the present invention, an offset represents a change in one or more coordinates in a set of coordinates. In some embodiments of the present invention, adjust coordinates mod 312 uses image processing techniques to adjust coordinates of a field on a second form. In some embodiments of the present invention, adjust coordinates mod 312 uses image processing techniques at a runtime. In some embodiments of the present invention, image processing techniques include, but are not limited to: (i) locating a keyword; and/or (ii) locating a value near a keyword. In some embodiments of the present invention, adjust coordinates mod 312 adjusts coordinates of a set of fields superimposed on a second form at a verification time.

In this example, adjust coordinates mod 312 uses OCR to determine content of each identified field (i.e., the invoice date, Feb. 26, 2015, and the invoice number, 70002). In this example, adjust coordinates mod 312 uses content locations to determine coordinates of the content. In this example, adjust coordinates mod 312 adjusts coordinates of superimposed field 802 and superimposed field 804 to create adjusted field 902 and adjusted field 904. In this example, adjust coordinates mod 312 determines coordinates of the invoice date for second form 700 are {6.0625, 1.125, 2.875, 0.25} and coordinates of the invoice number for second form 700 are {7.375, 1.09375, 1.1875, 0.25}. In this example, adjust coordinates mod 312 adjusts coordinates of superimposed field 802 and superimposed field 804 to match the coordinates of the identified fields. In this example, second coordinates form 900 (FIG. 9) shows a screenshot of adjust coordinates mod 312 adjusting a set of coordinates. Data extraction sometimes also includes extracting data within a set of coordinates on a second form.

Processing proceeds to operation S285, where receive mod 314 receives a set of adjustments of a set of fields. Adjustment of a set of fields is sometimes also called refinement. In some embodiments of the present invention, processing omits operations S285 and proceeds from operation S280 to operation S290. In some embodiments of the present invention, receive mod 314 receives a set of manual adjustments of a set of fields. In some embodiments of the present invention, receive mod 314 receives a set of automated adjustments of a set of fields. Receive mod 314 generally receives fine adjustments to a set of coordinates (e.g., fine tuning). For example, the invoice date identified by adjusted field 902 follows a colon; if adjust coordinates mod 312 had included the colon as part of adjusted field 902, receive mod 314 would receive an adjustment manipulating adjusted field 902 so as not to include the colon. In some embodiments of the present invention, receive mod 314 receives a set of adjustments through a graphical user interface. Alternatively, receive mod 314 receives a set of adjustments as an input of a modified set of coordinates. In some embodiments of the present invention, receive mod 314 receives a set of adjustments of a set of fields at a verification time.

Processing terminates at operation S290, where store mod 316 stores a second form. A stored second form is sometimes also called a trained template. In some embodiments of the present invention, store mod 316 stores a second form in a repository. In this example, store mod 316 stores second coordinates form 900 in form storage 218. In some embodiments of the present invention, store mod 316 stores a second form as a form with a set of identified fields. Alternatively, store mod 316 stores a second form as a set of identified fields on a blank form. A set of identified fields on a blank form is sometimes also called a form skin. For example, store mod 316 could store form skin 600 as a second form. In further alternative embodiments, store mod 316 stores a set of coordinates for a set of identified fields as a second form. In some embodiments of the present invention, store mod 316 stores a set of coordinates as a table.

III. Further Comments and/or Embodiments

Some embodiments of the present invention recognize the following facts, potential problems, and/or potential areas for improvement with respect to the current state of the art: (i) zonal OCR generally requires a new template for each document; and/or (ii) manual creation of a new template for each form is time and labor intensive.

Figure 4:
FIG. 4 depicts a screenshot of a first form according to a second embodiment of the present invention.

FIG. 4 depicts a screenshot of first form 400. First form 400 is an invoice from Stuart Apothecary. First form 400 contains various zones (sometimes also called fields), including: identified field 402; and identified field 404. Identified field 402 shows an invoice date of Aug. 17, 2015 (8/17/2015). Identified field 404 shows an invoice number of 2041955.

Figure 5:
FIG. 5 depicts a screenshot of a first coordinates form according to some embodiments of the present invention.

FIG. 5 depicts a screenshot of first coordinates form 500. First coordinates form 500 is first form 400 with a set of identified fields. First coordinates form 500 includes: identified field 502; and identified field 504. Identified field 502 and identified field 504 are each represented by a dashed line surrounding the identified field. In some embodiments of the present invention, a template training sub-system identifies an identified field by a set of coordinates. In some embodiments of the present invention, a template training sub-system identifies an identified field by a set of dimensions. In some embodiments of the present invention, a template training sub-system identifies a set of dimensions in pixels. In some embodiments of the present invention, a template training sub-system identifies a set of dimensions in inches. Alternatively, a template training sub-system identifies a set of dimensions in various units of measurement. In some embodiments of the present invention, a template training sub-system identifies an identified field in the format, {x-start, y-start, x-end, y-end}. In some embodiments of the present invention, a template training sub-system identifies an identified field in the format, {x-start, x-distance, y-start, y-distance}. In this example, the template training sub-system identifies the set of identified fields in the format {x-start, x-distance, y-start, y-distance}, wherein each value is measured in inches, as displayed in Table 1, below.

TABLE 1

| Identified Fields. | | |
|---|---|---|
| Fields | Field Names | Field Coordinates |
| Identified Field 502 | Invoice Date | {6.25, 1.25, 2.53125, 0.25} |
| Identified Field 504 | Invoice Number | {6.0625, 1.125, 2.875, 0.25} |

Figure 6:
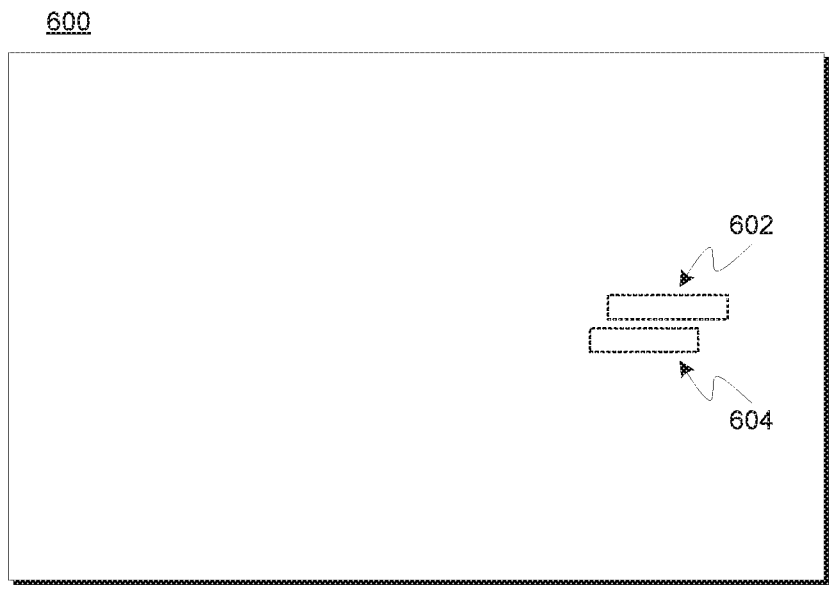
FIG. 6 depicts a screenshot of a form skin according to some embodiments of the present invention.

FIG. 6 depicts a screenshot of form skin 600. Form skin 600 is an application of a set of identified fields to a blank template. Form skin 600 contains: identified field 602; and identified field 604. In this example, identified field 602 has the same field coordinates relative to form skin 600 as identified field 502 has relative to first coordinates form 500. Additionally, identified field 604 has the same field coordinates relative to form skin 600 as identified field 504 has relative to first coordinates form 500.

Figure 7:
FIG. 7 depicts a screenshot of a second form according to some embodiments of the present invention.

FIG. 7 depicts a screenshot of second form 700. Second form 700 is an invoice from Rapid Car Repair. Second form 700 contains various zones (sometimes also called fields), including: identified field 702; and identified field 704. Identified field 702 shows an invoice date of Feb. 26, 2015 (02/26/15). Identified field 704 shows an invoice number of 70002. In this example, first form 400 and second form 700 display a variability among forms, specifically with respect to the locations of fields for an invoice date and an invoice number.

Figure 8:
FIG. 8 depicts a screenshot of a masked form according to some embodiments of the present invention.

FIG. 8 depicts a screenshot of masked form 800. Masked form 800 is an overlay of form skin 600 on second form 700. Masked form 800 contains: superimposed field 802; and superimposed field 804. In this example, superimposed field 802 has the same field coordinates relative to masked form 800 as identified field 502 has relative to first coordinates form 500. Additionally, superimposed field 804 has the same field coordinates relative to masked form 800 as identified field 504 has relative to first coordinates form 500. However, superimposed field 802 is not located around a field related to an invoice date. Additionally, superimposed field 804 is not located around a field related to an invoice number. Because superimposed field 802 and superimposed field 804 are not located around appropriated fields on masked form 800, adjustment to the locations of superimposed field 802 and superimposed field 804 are required.

Figure 9:
FIG. 9 depicts a screenshot of a second coordinates form according to some embodiments of the present invention.

FIG. 9 depicts a screenshot of second coordinates form 900. Second coordinates form 900 is masked form 800 with adjustments made to a set of identified fields, shown as adjusted field 902 and adjusted field 904. A template training sub-system adjusts the location of each of the two identified fields (adjusted field 902 and adjusted field 904) to properly locate the desired fields. In this example, a template training sub-system adjusts adjusted field 902 to locate an invoice date on second coordinates form 900 and adjusts adjusted field 904 to locate an invoice number on second coordinates form 900. In some embodiments of the present invention, a template training sub-system uses OCR to locate a field name on a form. In some embodiments of the present invention, a template training sub-system uses zonal OCR to locate a field name on a form. For example, first form 400 and second form 700 each have a field named "Invoice Date"; a template training sub-system can locate each of these field names using OCR techniques. Responsive to determining that the field names from first form 400 and second form 700 correspond, a template training sub-system can adjust a location for adjusted field 902 on second coordinates form 900 to properly identify an invoice date.

However, identified field 404 and identified field 704 have different field names. Identified field 404 appears as "Invoice No.," while identified field 704 appears as "Invoice #." Additionally, other variations of this field name are used, including "Invoice Number." In some embodiments of the present invention, a template training sub-system includes a thesaurus (sometimes also called a key file) including various field names and potential alternatives. In some embodiments of the present invention, a template training sub-system includes a thesaurus for abbreviations (e.g., number and no.). In some embodiments of the present invention, a template training sub-system includes a thesaurus for various regional spellings (e.g., color and colour). In some embodiments of the present invention, a template training sub-system includes a thesaurus for various misspellings (e.g., number and nomber). In some embodiments of the present invention, a template training sub-system includes a thesaurus for symbolic representations of words (e.g., number and #). In this example, a template training sub-system determines that "Invoice No." on first form 400 and "Invoice #" on second form 700 represent corresponding fields on different forms. Responsive to determining that the field names from first form 400 and second form 700 correspond, a template training sub-system can adjust a location for adjusted field 904 on second coordinates form 900 to properly identify an invoice number. In some embodiments of the present invention, a template training sub-system includes a thesaurus for various formatting of a field (e.g., date formatting: M/D/YY; MM/DD/YY; DD/MM/YYYY; Month Day, Year; Day Month Year; etc.). In this example, a template training sub-system determines coordinates for adjusted field 902 and adjusted field 904 as displayed in Table 2, below.

TABLE 2

Adjusted Fields.

| Fields | Field Names | Field Coordinates |
|---|---|---|
| Adjusted Field 902 | Invoice Date | {6.0625, 1.125, 2.875, 0.25} |
| Adjusted Field 904 | Invoice Number | {7.375, 1.09375, 1.1875, 0.25} |

Some embodiments of the present invention may include one, or more, of the following features, characteristics, and/or advantages: (i) training a new image template based on an automatic recognition of a set of fields; (ii) refining a set of fields in a new template based, at least in part, on an image processing technique (also sometimes called an edge detection technique); (iii) improving an identification of a set of fields; (iv) creating a finger print template for a set of input images; and/or (v) improving conventional zonal OCR techniques.

Some embodiments of the present invention may include one, or more, of the following features, characteristics, and/or advantages: (i) creating a set of image templates; (ii) identifying a set of fields; (iii) automating a creation of a set of image templates; (iv) automating an identification of a set of fields; (v) employing image capture techniques to a set of forms; and/or (vi) employing enterprise content management to a set of image templates.

Some embodiments of the present invention may include one, or more, of the following features, characteristics, and/or advantages: (i) creating a new template based, at least in part, on a set of existing templates; (ii) creating a set of field definitions in a new template based, at least in part, on a set of field definitions in a set of existing templates; (iii) aligning a set of field definitions on a new template based on image processing; and/or (iv) superimposing a set of field definitions on a new template based on image processing.

Some embodiments of the present invention may include one, or more, of the following features, characteristics, and/or advantages: (i) superimposing a set of fields from a first template to a second template; (ii) superimposing a set of fields at a runtime; (iii) training a new template; (iv) using an automatic process to train a new template; (v) correcting a new template; and/or (vi) using an automatic process to correct a new template.

Some embodiments of the present invention may include one, or more, of the following features, characteristics, and/or advantages: (i) superimposing a set of fields from a first image to a second image; (ii) applying a superimposition of a set of fields at a runtime; and/or (iii) training an image template.

Some embodiments of the present invention may include one, or more, of the following features, characteristics, and/or advantages: (i) adjusting a field offset based, at least in part, on image processing; and/or (ii) using an automatic process to adjust a field offset based, at least in part, on image processing.

Some embodiments of the present invention may include one, or more, of the following features, characteristics, and/or advantages: (i) creating a set of image templates; (ii) creating a set of image templates by reading a first template and superimposing the first template on a received image; (iii) refining a new template; (iv) creating a fingerprint of a received image through the use of a template; and/or (v) creating a new template and a set of field definitions automatically.

Some embodiments of the present invention may include one, or more, of the following features, characteristics, and/or advantages: (i) decreasing delays caused by manual creation of a new template; (ii) increasing throughput of new templates; (iii) automating the creation of mapping a template to a new form; (iv) decreasing a likelihood of encountering human errors; (v) decreasing a time required to manually adjust a set of coordinates for a field; (vi) creating a field at a run time; and/or (vii) adjusting a field at a design time.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
   applying a first template, the first template having a first template field name corresponding to a first template field, to a form, the form having a form field name corresponding to a form field to generate a template-form document;
   determining the first template field is not proximate the form field name on the template-form document;
   generating a second template from the first template by relocating the first template field by, with reference to the first template, locating the first template field proximate the form field name, the form including a form content associated with the form field name, the form content located in a form field proximate the form field name, the form content having a form field length, the relocated first template field being a second template field; and
   generating a set of coordinates for the second template field including the form field length;
   wherein:
   at least determining the first template field is not proximate the form field name is performed by computer software running on computer hardware.

2. The method of claim 1, further comprising:
   determining a first set of coordinates for the first template field, the first set of coordinates including the form field length;
   generating the first template based, at least in part, on the first set of coordinates, the first template including the first template field name corresponding to the first template field.

3. The method of claim 1, further comprising:
   receiving a set of adjustments to the set of coordinates for the set of second template field.

4. The method of claim 1, further comprising:
   determining a set of names respectively corresponding to a set of first fields including the first field.

5. The method of claim 1, further comprising:
   applying the second template to the form to generate a second template-form document; and
   displaying the second template-form document.

6. The method of claim 5, wherein applying the second template to the form is performed at a runtime.

7. The method of claim 1, further comprising:
   storing the second template-form document.

8. A computer program product comprising:
   a computer readable storage medium having stored thereon:
   first instructions executable by a device to cause the device to apply a first template, the first template having a first template field name corresponding to a first template field, to a form, the form having a form field name corresponding to a form field to generate a template-form document;
   second instructions executable by a device to cause the device to determine the first template field is not proximate the form field name on the template-form document;
   third instructions executable by a device to cause the device to generate a second template from the first template by relocating the first template field by, with reference to the first template, locating the first template field proximate the form field name, the form including a form content associated with the form field name, the form content located in a form field proximate the form field name, the form content having a form field length, the relocated first template field being a second template field; and
   fourth instructions executable by a device to cause the device to generate a set of coordinates for the second template field including the form field length.

9. The computer program product of claim 8, further comprising:
   fifth instructions executable by a device to cause the device to determine a first set of coordinates for the first template field, the first set of coordinates including the form field length;
   sixth instructions executable by a device to cause the device to generate the first template based, at least in part, on the first set of coordinates, the first template including the first template field name corresponding to the first template field.

10. The computer program product of claim 8, further comprising:
    fifth instructions executable by a device to cause the device to receive a set of adjustments to the set of coordinates for the set of second template field.

11. The computer program product of claim 8, further comprising:
    fifth instructions executable by a device to cause the device to determine a set of names respectively corresponding to a set of first fields including the first field.

12. The computer program product of claim 8, further comprising:
    fifth instructions executable by a device to cause the device to apply the second template to the form to generate a second template-form document; and
    sixth instructions executable by a device to cause the device to display the second template-form document.

13. The computer program product of claim 12, wherein applying the second template to the form is performed at a runtime.

14. The computer program product of claim 8, further comprising:
    fifth instructions executable by a device to cause the device to store the second template-form document.

15. A computer system comprising:
    a processor set; and
    a computer readable storage medium;
    wherein:
    the processor set is structured, located, connected, and/or programmed to execute instructions stored on the computer readable storage medium; and
    the instructions include:
    first instructions executable by a device to cause the device to apply a first template, the first template having a first template field name corresponding to a first template field, to a form, the form having a form field name corresponding to a form field to generate a template-form document;

second instructions executable by a device to cause the device to determine the first template field is not proximate the form field name on the template-form document;

third instructions executable by a device to cause the device to generate a second template from the first template by relocating the first template field by, with reference to the first template, locating the first template field proximate the form field name, the form including a form content associated with the form field name, the form content located in a form field proximate the form field name, the form content having a form field length, the relocated first template field being a second template field; and fourth instructions executable by a device to cause the device to generate a set of coordinates for the second template field including the form field length.

16. The computer system of claim 15, further comprising:

fifth instructions executable by a device to cause the device to determine a first set of coordinates for the first template field, the first set of coordinates including the form field length;

sixth instructions executable by a device to cause the device to generate the first template based, at least in part, on the first set of coordinates, the first template including the first template field name corresponding to the first template field.

17. The computer system of claim 15, further comprising:

fifth instructions executable by a device to cause the device to receive a set of adjustments to the set of coordinates for the set of second template field.

18. The computer system of claim 15, further comprising:

fifth instructions executable by a device to cause the device to apply the second template to the form to generate a second template-form document; and sixth instructions executable by a device to cause the device to display the second template-form document.

19. The computer system of claim 18, wherein applying the second template to the form is performed at a runtime.

20. The computer system of claim 15, further comprising:

fifth instructions executable by a device to cause the device to store the second template-form document.

\* \* \* \* \*